United States Patent [19]
Hushower et al.

[11] 3,876,023
[45] Apr. 8, 1975

[54] CONNECTION FOR VEHICLE MODULES

[75] Inventors: Richard R. Hushower, Buchanan;
Ronald M. Jesswein, Berrien Springs; Ralph M. Duttarer, Saint Joseph, all of Mich.

[73] Assignee: Clark Equipment Company, Buchanan, Mich.

[22] Filed: June 18, 1974

[21] Appl. No.: 480,326

[52] U.S. Cl............ 180/14 R; 180/12; 180/79.2 B; 280/6 H
[51] Int. Cl.............................................. B60d 7/00
[58] Field of Search............ 180/14 R, 14 B, 11, 12; 280/420, 421

[56] References Cited
UNITED STATES PATENTS

| | | | |
|---|---|---|---|
| 3,478,833 | 11/1969 | Breon et al. | 180/12 |
| 3,479,055 | 11/1969 | Cunha et al. | 280/421 X |
| 3,563,329 | 2/1971 | Licari | 180/12 |
| 3,648,794 | 3/1972 | Clepper | 180/14 R |

*Primary Examiner*—Leo Friaglia
*Attorney, Agent, or Firm*—Kenneth C. Witt

[57] ABSTRACT

An alignment and connection mechanism for a vehicle which is separable into a tractor module and an implement module, each module having a coupling plate which is connectable to the coupling plate on the other module to form a complete vehicle. The coupling plate on the tractor module includes a mechanism for use in aligning the tractor module and the implement module prior to connecting them together. The mechanism includes a first curvilinear alignment device and a second curvilinear alignment device which is hollow. Within the hollow portion of the second alignment device is a portion of a drive shaft, and a removable cap is provided on the second alignment device for protecting the drive shaft portion.

4 Claims, 4 Drawing Figures

FIG. 3
FIG. 4
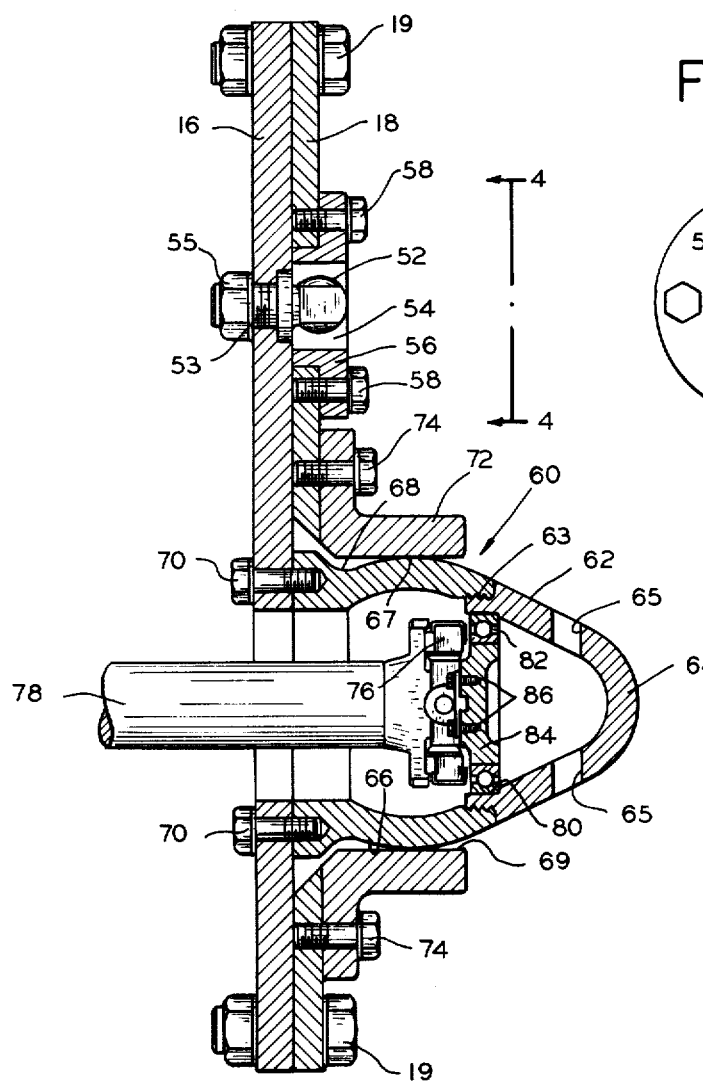
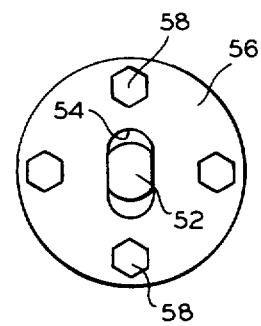

CONNECTION FOR VEHICLE MODULES

BACKGROUND OF THE INVENTION

1. Field of the Invention

This invention relates to modular vehicles comprising a tractor module and an implement module which can be readily connected together and disconnected. By utilizing different implement modules with the same tractor module it is possible to form a variety of different types of vehicles.

2. Description of Prior Art

U.S. Pat. No. 3,563,329 Licari, dated Feb. 6, 1971, is illustrative of the type of vehicle mentioned. This patent discloses a vehicle comprising a two wheel tractor module which includes a pivotable connection portion. There are auxiliary wheels on the connection portion to make it possible to move the two wheel tractor module under its own power when it is not coupled to an implement module.

When it is desired to couple the tractor module to a vehicle module there can be alignment difficulties, particularly if one or both of the modules is resting on ground which is not level. The object of the present invention is to provide an alignment and coupling arrangement which is an improvement on the aforesaid patent and facilitates alignment of the tractor module with an implement module and the subsequent coupling together of the two modules to form a complete vehicle.

SUMMARY OF THE INVENTION

In carrying out this invention in one preferred form we provide an alignment mechanism on the connection portion of a tractor module for use in aligning the tractor module with an implement module which includes a first curvilinear alignment device on the connection portion. Also located on the connection portion is a second curvilinear alignment device, the said second alignment device being hollow. A portion of a drive shaft is located in the hollow portion of the second alignment device and a removable cap is provided on the second alignment device for protecting the drive shaft portion.

BRIEF DESCRIPTION OF THE DRAWING

FIG. 3 is a fragmentary sectional view of the coupling portions and alignment mechanisms of both modules, FIG. 4 is a fragmentary view along the line 4—4 of FIG. 3.

DESCRIPTION OF PREFERRED EMBODIMENT

Figure 1:
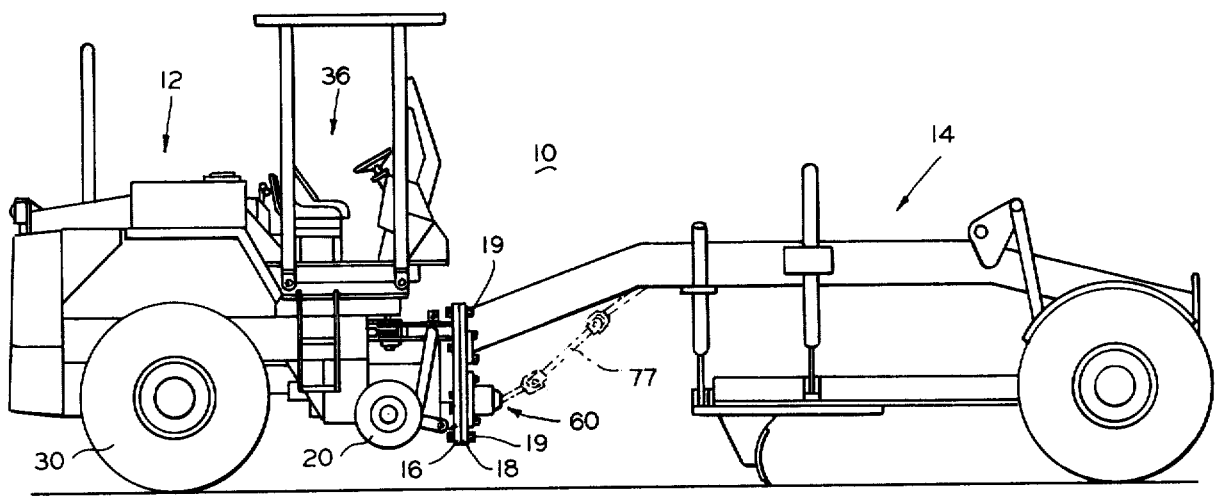
FIG. 1 is a schematic side elevational view showing a complete articulated vehicle which includes a tractor module coupled to an implement module.

Referring to FIG. 1 of the drawing there is shown a complete articulated vehicle which is indicated generally by the numeral 10 and is composed of two separable parts, a tractor module indicated by the numeral 12 and an implement module indicated by the numeral 14. The implement module illustrated is a grader implement which, when coupled to the tractor module as is shown, makes a complete motor grader vehicle for the movement of dirt or other material by scraping and pushing.

Figure 2:
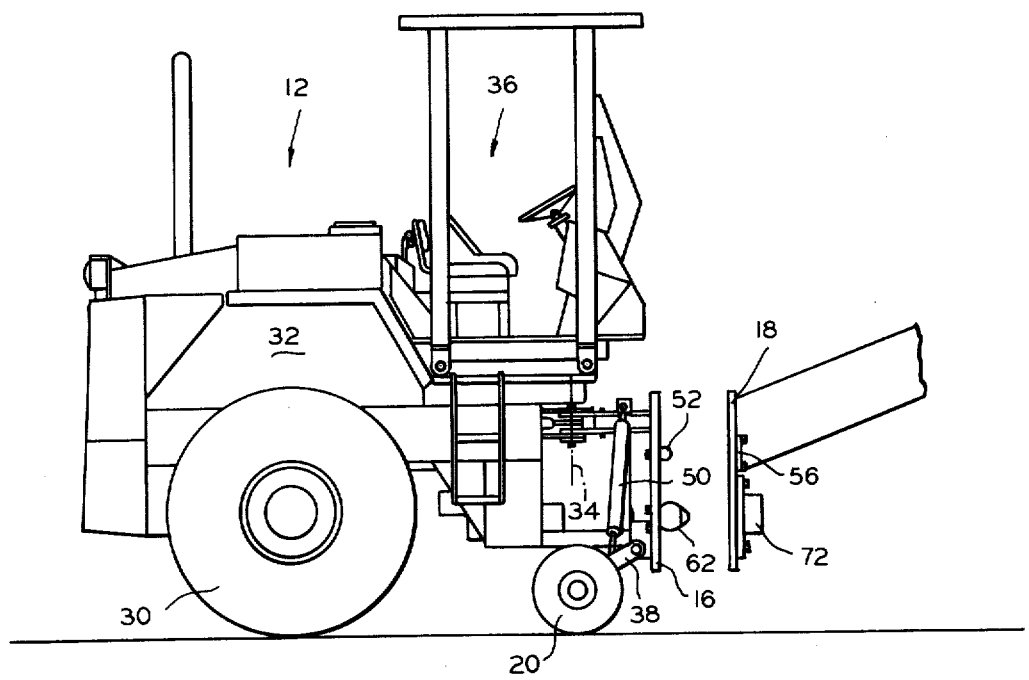
FIG. 2 shows the tractor module and a portion of the implement module disconnected from each other but in condition ready to be connected together.

The tractor module 12 and implement module 14 are detachably secured together in a suitable manner such as by means of bolts 19 through the coupling plate 16 on the tractor module and coupling plate 18 on the implement module. FIG. 2 shows the tractor module detached from the implement module, and when thus detached the tractor module is supported on auxiliary wheels 20. The auxiliary wheels 20 are utilized to maneuver the tractor module for connection to the implement module and after such connection has been accomplished the auxiliary wheels 20 are retracted as illustrated in FIG. 1. For more information on the manner in which the auxiliary wheels are utilized reference can be had to the aforesaid U.S. Patent.

FIGS. 2 and 3 of the drawing show the coupling plates and the alignment mechanisms on each. It will be appreciated that coupling plate 16 is connected to the main body portion 32 of the tractor module to pivot about a vertically disposed axis 34 under control of the operator. Thus, when tractor module 12 is disconnected from an implement module and is supported on its main drive wheels 30 and auxiliary wheels 20 as in FIG. 2, the operator can maneuver the tractor module by pivoting the front connection portion of the tractor module, including coupling plate 16 from side to side in order to steer the tractor module as it is propelled by an engine and drive line of known type which are embodied in tractor module 12, and thus move the coupling plate 16 relative to coupling plate 18.

To accommodate the vehicle module 12 to uneven terrain the auxiliary wheels 20, one on each side of the tractor module, may be raised and lowered individually by the operator located at the operator's station 36. Each of the auxiliary wheels 20, only one of which is visible in the drawing, is mounted on a pivotal arm 38 and may be raised and lowered by remote control of the operator by means of a hydraulic actuator 50. The two actuators 50 for the wheels can be raised and lowered individually to adjust to any terrain.

Projecting from the front of coupling plate 16 is a pilot projection member or alignment device 52 which is curvilinear in configuration. As shown, the principal portion of device 52 is spherical, while a portion 53 thereof projects through plate 16 and the device 52 is secured to the plate by means of a nut 55. The coupling plate 18 on the implement module has a mating elongated opening 54 (see FIG. 4) which as illustrated is in a removable bushing member indicated at 56 which is secured to coupling plate 18 in a suitable manner such as by machine screws 58. It will be appreciated that both device 52 and bushing 56 preferably are of very hard or hardened material to minimize wear during the alignment and coupling operation described hereinafter.

Also projecting from the front surface of coupling plate 16 is another curvilinear alignment device indicated generally by the numeral 60. As shown, device 60 includes a conically shaped portion 62 with a rounded closed outer end 64. Closer to plate 16, the device 60 has an outwardly curved portion 66 and necked down portion 68. Device 60 is secured to plate 16 in a suitable manner such as by machine screws 70.

The largest diameter portion of device 66 which is indicated at 67 fits snugly within an opening 69 in a circular fitting 72 which is secured in a suitable manner such as by machine screws 74 to plate 18. Both device 60 and fitting 72 preferably are of hard or hardened steel.

Within device portion 62 is a portion of a coupling indicated at 76, such coupling being mounted on shaft 78 which is connected to the drive line or propulsion mechanism of the tractor module 12. The illustrated coupling end of shaft 78 is supported for rotation within device 62 in a manner described hereinafter.

The initial step in joining the two modules to form a complete vehicle is to engage the device 60 in the opening 69 by driving the tractor module forwardly under its own power and at the same time raising or lowering the auxiliary wheels 20 as necessary to achieve such engagement. Then, if necessary, the coupling plate 16 is raised along with the entire front end of the tractor module, which also raises or lowers the coupling plate 16 and the end of the implement module until the two coupling plates 16 and 18 are approximately parallel. At the same time, the connection plate 16 can, if necessary, be moved circumferentially with respect to coupling plate 18 by raising or lowering only one of the auxiliary wheels 20 or raising one and lowering the other. Because of the longitudinal, horizontally disposed pivotal connection between the main axle which carries wheels 30 and the body portion 32 such movement of the coupling plate 16 is made possible. By maneuvering in this manner the operator can align secondary pilot projection or alignment device 52 with mating opening 54 in coupling plate 18. When this has been achieved the operator knows that the two modules are close to proper alignment and he can then drive the tractor module forwardly sufficiently that the two connection plates abut each other firmly, after which they can be secured together in a suitable manner such as by bolts 19.

It will be appreciated that the forwardly projecting curvilinear configuration of the alignment device 60 facilitates the entry of device 60 into opening 69 even though the two coupling plates 16 and 18 are misaligned considerably as the alignment operation is undertaken. The curvilinear configuration of device 60 facilitates moving the coupling plate 18 and the implement on which it is mounted into alignment with coupling plate 16 as the tractor module moves forwardly, and a snug fit between portion 16 of device 60 and opening 69, along with a similar fit between device 52 and opening 54, assures accurate alignment after the two coupling plates have been brought together as illustrated in FIG. 3. The curvilinear configuration of device 52 facilitates the entry of this device into opening 54 as the alignment operation proceeds, as coupling plate 16 is moving toward coupling plate 18.

After the two coupling plates have been moved to the position illustrated in FIG. 3, it is possible then to remove a cover on device 60 which, as shown comprises portion 62,64, such portion being secured to the remainder of the device in a suitable manner such as by screw threads at 63. Openings 65 are provided for the use of a bar to facilitate removal and replacement of cover 62,64.

Inside cover 62,64, an anti-friction bearing 82 is provided which is secured to portion 62 of the cover. Such bearing in turn has mounted therein, preferably with a press fit, a rotatable member 84. Coupling portion 76 is secured co-axially to rotatable member 84 by means of cap screws 86 during the time that the tractor module 12 is operating with the cover 62,64 in place. It will be appreciated that this arrangement maintains the illustrated coupling end of shaft 78 in proper position during such operation and prevents it from undesired movement away from its normal axis which could cause coupling portion 76 to contact the inside surface of the device 60 and cause damage. Prior to removing cover 62,64 it is necessary first, in the construction illustrated, to remove cap screws 86 to free the end of the shaft 78 from the cover member 62,64 and the associated internal structure.

After the cover 62,64 has been removed it is then possible to connect a drive shaft for the implement module 14 to the coupling 76 in order to provide a four wheel drive vehicle. The approximate location of such drive shaft is indicated by the dashed lines 77 in FIG. 1.

While we have described and illustrated herein the best mode now contemplated for carrying out our invention, it will be appreciated that modifications may be made by those skilled in the art. Accordingly, we intend to cover by the appended claims all such modifications which fall within the true spirit and scope of our invention.

We claim:

1. In a tractor module having a body portion, a pair of drive wheels supporting the body portion, a connection portion located at one end of the body portion and pivotally connected about a vertically disposed axis to the body portion, and a pair of individually adjustable auxiliary wheels on the connection portion, an alignment mechanism on the connection portion for use in aligning the tractor module and an implement module prior to connecting them together, comprising a first curvilinear alignment device on the connection portion and a second curvilinear alignment device on the said connection portion, the said first alignment device being hollow, a portion of a drive shaft located in the said hollow portion, and a removable cap on the said first alignment device for protecting the said drive shaft portion.

2. In a vehicle having a tractor module detachably connected to an implement module, the tractor module including a body portion, a pair of drive wheels supporting the body portion, a first coupling plate located at one end of the body portion and pivotally connected about a vertically disposed axis to the body portion, and a pair of retractable auxiliary wheels connected to the first coupling plate, and the implement module including a pair of wheels and a second coupling plate detachably connected to the first coupling plate, an alignment mechanism on the first coupling plate comprising a first curvilinear alignment device, the said first alignment device being hollow, a portion of a drive shaft located in the said hollow portion, a removable cap on the said first alignment device for protecting said drive shaft portion, a first opening in the second coupling plate through which the said first alignment device extends in snug fitting relation when the said coupling plates are in the confronting coupled condition, a second curvilinear alignment device on the first coupling plate, and a second opening in the second coupling plate receiving the said second alignment device when the said two coupling plates are in the confronting coupled condition.

3. An alignment mechanism as specified in claim 2 in which the said first opening in the said second coupling plate is formed by a removable fitting, and the said second opening in the said second coupling plate is formed by a second removable fitting.

4. An alignment mechanism as specified in claim 2 in which the aid removable cap includes an internal rotatable member, and means detachably connecting the said drive shaft portion to the said internal rotatable member.

* * * * *